United States Patent [19]

Schuss et al.

[11] 4,164,373
[45] Aug. 14, 1979

[54] SPECTROMETER EMPLOYING OPTICAL FIBER TIME DELAYS FOR FREQUENCY RESOLUTION

[75] Inventors: Jack J. Schuss, Providence, R.I.; Larry C. Johnson, Princeton, N.J.

[73] Assignee: The United States of America as represented by the United States Department of Energy, Washington, D.C.

[21] Appl. No.: 868,952

[22] Filed: Jan. 12, 1978

[51] Int. Cl.² .................... G01J 3/30; G01N 21/52
[52] U.S. Cl. .................... 356/316; 250/227; 356/328; 356/317; 356/338
[58] Field of Search .................. 356/83, 85, 97, 100, 356/101, 308, 317, 316, 318, 328, 331, 338; 250/227

[56] References Cited

U.S. PATENT DOCUMENTS

| 3,547,542 | 12/1970 | Bulpitt et al. | 356/83 |
| 3,880,723 | 4/1975 | Thomas | 356/100 |
| 3,885,879 | 5/1975 | Louder et al. | 356/100 |
| 3,892,468 | 7/1975 | Duguay | 250/227 |

*Primary Examiner*—Vincent P. McGraw
*Attorney, Agent, or Firm*—Dean E. Carlson; Leonard Belkin; C. Daniel Cornish

[57] ABSTRACT

This invention provides different length glass fibers for providing a broad range of optical time delays for short incident chromatic light pulses for the selective spatial and frequency analysis of the light with a single light detector. To this end, the frequencies of the incident light are orientated and matched with the different length fibers by dispersing the separate frequencies in space according to the respective fiber locations and lengths at the input terminal of the glass fibers. This makes the different length fibers useful in the field of plasma physics. To this end the short light pulses can be scattered by a plasma and then passed through the fibers for analyzing and diagnosing the plasma while it varies rapidly with time.

6 Claims, 8 Drawing Figures

SPECTROMETER EMPLOYING OPTICAL FIBER TIME DELAYS FOR FREQUENCY RESOLUTION

BACKGROUND OF THE INVENTION

In the field of plasma physics, it is desirable to analyze the bahavior of a short light pulse whose spectra vary rapidly with time. In one application, for example, it is desirable to analyze the time behavior of a pulse of below 100 nanoseconds duration that is scattered by a time varying plasma to produce complex and variable spectra corresponding with certain important and rapidly changing plasma characteristics. Heretofore, however, this analysis has required spectrometers employing a plurality of separate and expensive photomultiplier tube light detectors and a plurality of separate and expensive oscilloscopes for each of a plurality of frequency channels of the incident light. Moreover, it has been a problem of no small significance to calibrate the various detectors and oscilloscopes.

SUMMARY OF THE INVENTION

This invention provides different length optical fibers for providing a broad range of optical time delays for specific frequencies of a short incident chromatic light pulse of below 100 nanoseconds duration for the selective spatial and frequency analysis of the light with a single light detector. These optical fibers comprise a plurality of specific, low-gloss, glass fibers having different lengths that are specifically mounted and arranged with flat ends normal to the respective fiber axes for transmitting the light with time delays in accordance with the individual lengths of the fibers. Specific terminal means are provided for holding the respective ends of the different length fibers in contact with each other.

In one specific application, this invention diagnoses a time varying plasma by providing a plurality of different length fibers for producing a broad range of optical time delays for incident light that passes through the plasma for the selective spatial and frequency analysis of the light with a single light detector. To this end, the improvement of this invention, comprises a light source means of an incident light pulse scattered by the plasma, a plurality of uniform diameter, low-loss, glass fibers having different lengths and flat polished ends normal to the respective fiber axes for receiving and transporting the transmitted light with time delays that correspond with the individual lengths of the fibers; terminal means for holding the respective ends of the fibers in contact with each other in spaced apart planes in longitudinally extending arrays that are corrected to nullify the imperfections in the polish of the fiber ends; matching means adjacent to one terminal means having means for dispersing the incident light frequencies in space and orientating the frequencies in space as a function of the orientation and location in space of the fiber ends in the one terminal means; and means adjacent to the other terminal means having a single light detection means for matching the outgoing light from the fiber ends of the other terminal means for detection by the single light detector in accordance with the time delays produced for determining the effects on the light by its transmissions through the time varying plasma. With the proper selection of fiber and terminal elements and their arrangement, as described in more detail hereinafter, the desired optical time delays are provided.

OBJECT OF THE INVENTION

It is an object of this invention, therefore, to provide different length glass fibers for providing a broad range of optical time delays for incident space orientated chromatic light frequencies;

It is another object to provide the selective spatial and frequency analysis of chromatic light with a single light detector;

It is still further object to provide a improved spectrometer for plasma diagnosis.

The above and further novel features and objects of this invention will become apparent from the following detailed description of several embodiments of this invention when read in connection with the accompanying drawings, and the novel features will be particularly pointed out in the appended claims. It is to be expressly understood, however, that the drawings are not a definition of the invention but are for the purpose of illustration only.

BRIEF DESCRIPTION OF THE DRAWINGS

In the drawings where like elements are referenced alike:

FIG. 1-a is a schematic view of the amplitude of one frequency of the incident light as a function of time in the apparatus of FIG. 1; FIG. 1-b is a schematic view of the spectal envelope of the incident light of the apparatus of FIG. 1; FIG. 1-c is a schematic view of the output of the spectrometer apparatus of FIG. 1 as a function of time; illustrating the amplitudes of the individual frequencies in the envelope of FIG. 1-b;

DESCRIPTION OF THE PREFERRED EMBODIMENT

This invention has been used for measuring various plasma characteristics, but it will be understood that it is useful for a wide variety of applications requiring a broad range of optical time delays for the different frequencies of short pulses of incident chromatic light. More particularly, this invention is useful in any application requiring the selective spatial and frequency analysis of short pulses of chromatic light with a single detector.

It is known that plasmas can be diagnosed by detecting light scattered by the plasma, since the plasma scatters the light frequencies according to known laws of physics. One well known plasma diagnostic system is the Thompson scattering system used in diagnosing the high temperature, time varying plasmas at the Princeton Plasma Physics Laboratory.

Figure 1:
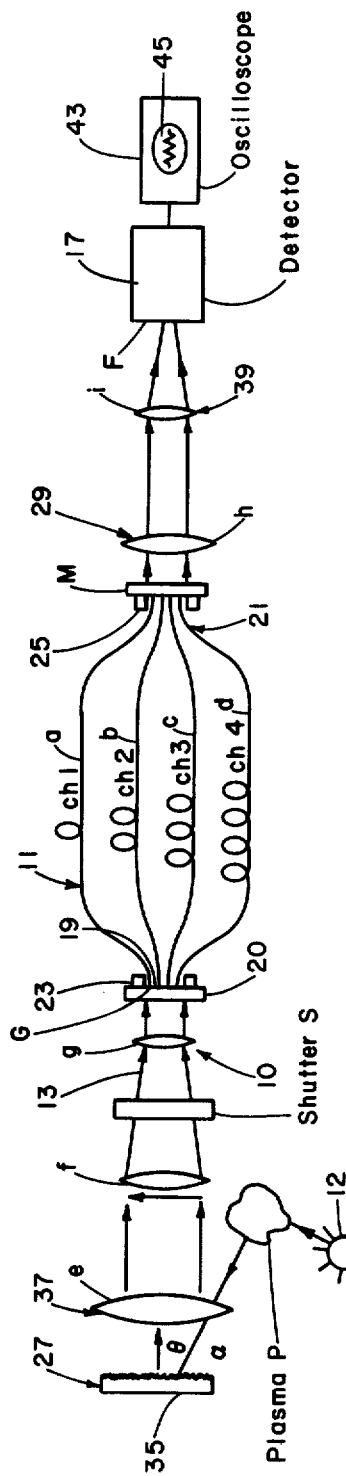
FIG. 1 is a partial schematic view of the principles of this invention for use in diagnosing a plasma.
Figure 1A:
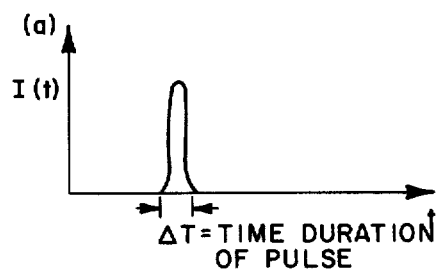
Figure 1B:
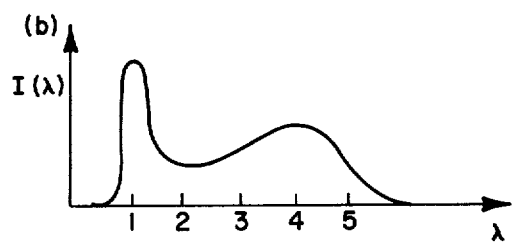

The main elements of the preferred embodiment of the spectrometer 10 of this invention, and the principles of their operation can be understood by reference to FIG. 1, which illustrates different length glass fibers 11 and a light source 12, which directs a light pulse into plasma P; the short scattered light pulse 13 that passes through shutter S contains a variety of frequencies and detector 17 can be used for diagnosing the plasma parameters, characteristics, etc. Should specific of those frequencies be dispersed in space as spectral lines according to a specific system of stepping in accordance with this invention, and then received and transmitted by respective of a plurality of specific, low-loss, glass fibers 11 having specific ends 19 and mountings M, as well as a specific correspondingly stepped lengths, which are referred to for convenience, for example, as a, b, c, d, then these specific frequencies will be spread in time at the fiber output ends by specific time delays for sequential detection and simultaneous display by specific detection means. More particularly, these specific frequencies can be transmitted with specific time delays for the selective spatial and frequency analysis of each light pulse with a single light detector 17.

Referring now more particularly to the fiber ends 19, they are polished to be optically flat, are butted up against a glass slide 20 and glued thereto with a transparent glue G to nullify the imperfections in the optical polish at the ends of the fibers. Additionally, the flat ends of the fibers are normal to their respective fiber axes. Still further, they are held in contact with each other in longitudinally extending arrays 21 in spaced apart planes in cross-section by picture-frame-shaped terminal means 23 and 25 adapted for use with suitable first and second respective matching means 27 and 29.

The first or input matching means 27 is adjacent to the input terminal means 23 for dispersing and orientating the light frequencies in space as a function of the space orientation of the input fiber ends in the input terminal means. Thus, certain fibers are adapted simultaneously to receive particular frequency components of the incoming light by forming a particular incident light frequency channel. For example, channel 1 is lined up in space for transmission of one frequency through one particular fiber, e.g., a fiber of length a; another particular frequency channel, e.g., channel 2, is lined up for transmission of another particular frequency spaced up to 25Å or more from the one first frequency through one particular fiber, e.g., a fiber of length b; another particular frequency channel of like frequency spacing, e.g., channel 3, is lined up for transmission of another like spaced frequency through another particular fiber, e.g., a fiber of length c; and another particular frequency channel, e.g., 4, is lined up for transmission in like manner through another particular fiber, e.g., a fiber of length d. As a practical matter the larger the spread in space between channels the larger the system required.

Should the second or output matching means 29, which is adjacent to the second or ouput terminal means 25 sequentially transmit the specific time delayed signals, to detection means 17 for recording, monitoring, interpretation, analysis, etc., then the desired selective spatial and frequency analysis of the light can be made with the single light detector 17.

In one embodiment, it has been discovered that the first matching means 27 for dispersing and separating the various frequencies of the incident light in pulse 13 in space can be a precision, commercial, longitudinally extending, rectangular cross-section, flat, finely lined, diffraction grating 35, which can be combined with suitable conventional lenses 37, such as lenses e, f and g, for matching the incident chromatic light pulse 13 to the fiber ends 19 in the one terminal means 23. This is because the grating 35 disperses the light in cross-section in a plane at right angles to its axis in a longitudinally extending array that corresponds with the orientation of the longitudinally extending array of the fiber ends, and the lenses e, f and g complete the matching by focussing the dispersed frequencies on the input fiber ends, while maintaining the desired correspondence. Likewise, conventional output lenses 39 are used to maintain the desired correspondence while focussing the outgoing frequency components on to the face of photodetector 17. To this end, for example, lenses h and i transmit and focus the output image from the ends of fiber array on to the photo-multiplier tube detector 17 for analysis by means of an oscilloscope 43 connected thereto in a conventional manner for producing a single trace 45 corresponding to all the input signals.

The grating is blazed or ruled in a conventional manner going back to Rowland's pioneering work in 1882 to produce precisely ruled, closely spaced, parallel, v-shaped blazes in uniformly lined grooves that form parallel lines on a light reflecting surface, as described in "International Dictionary of Physics and Electronics," Van Nostrand, 1956. With such a blaze shape the grating throws a large fraction of the incident radiation into one general direction in a beam, which has a rectangular cross-section in a plane, and each given wavelength is dispersed into specific, periodic, sequential and equally spaced, longitudinally extending, parallel, spectrum lines in a specific order that progresses in space at right angles to the direction of the beam, the order being described e.g., on pages 6–94 to 95 of "Handbook of Physics," by Condon and Odishaw, McGraw Hill, N.Y. 1958.

This order can be focused into an image of the source in the same phase in approximately parallel wavefronts according to the blazes provided. In one embodiment the incident light wave of focused parallel wavefronts reaches the grating blazes along the incident beam axis at an incident angle $\alpha$, to the plane of the grating for diffraction along an outgoing beam axis at an angle $\theta$ to the plane of the grating. The diffracted light spreads over some appreciable angle due to specific diffraction effects of the blazes, e.g., due to the specific angle of the blazes, which are uniformly spaced. The path difference of the diffracted light from successive blazes arrives in successive wavetrains that reach the outgoing lens in the same phase, so that when they are brought to a focus F, they have approximately parallel wavefronts in synchronism and they are separated in space by the blazes to produce a bright image of the distant source.

In one example, the grating is a Bausche and Lombe grating Model No. 35-53-15-290, having a flat, 4"×4", aluminized surface in a plane, and 1800 lines/mm at a blaze $\lambda = 5000$Å

Figure 1C:
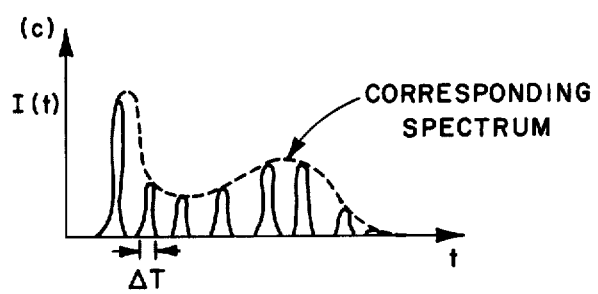

A typical sequence is illustrated in FIGS. 1-a to 1-c. Thus, for example, it can be seen that the amplitude of each frequency channel is detected in a single oscilloscope 43, although the respective frequency channels are sequentially received by the detector 17. The amplitude of an incident light pulse as a function of time in arbitrary units is shown in FIG. 1-a, while the spectrum of the incident light pulse is illustrated in arbitrary units by FIG. 1-b. Likewise, the output 45 of the spectrometer 10 as a function of time is illustrated in FIG. 1c.

Figure 2:
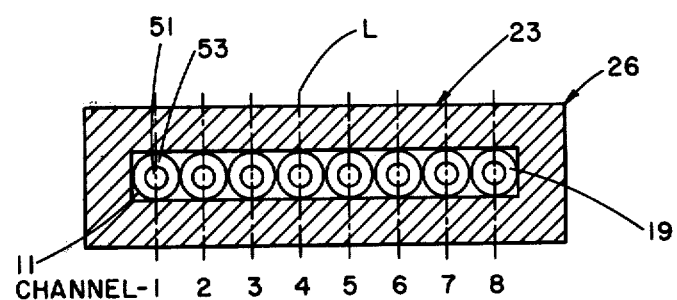
FIG. 2 is a partial cross-section of one embodiment of the terminal fiber array of the apparatus of FIG. 1.

In a practical embodiment for holding lowloss fiber ends 19 in contact with each other in a longitudinally extending array so that the ends of the fibers are in spaced apart planes normal to the respective fiber axes, the individual fibers have an inner uniform diameter low-loss core 51 and an outer cylindrical sleeve 53 of uniform outside diameter having a different index of refraction from the cross 51, as shown in FIG. 2. The index of refraction of the fibers' central cores may be uniform or may be a parabolic function of radius. Also, the terminals 23 and 25 form a picture frame-shaped clamp 26 in cross-section that conforms the fiber ends to the same cross-sectional shape, as shown in FIG. 2.

Figure 3:
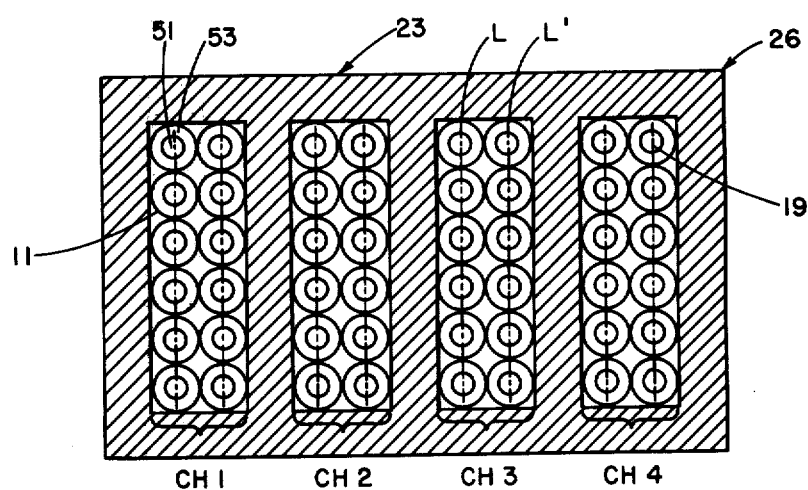
FIG. 3 is a partial cross-section of another embodiment of the terminal fiber array of the apparatus of FIG. 1.

In the embodiment of FIG. 2, the ends 19 of the different length fibers 11 form a longitudinally extending rectangularshaped array in cross-section in the plane of the paper of the figure, and only one fiber is allotted for each frequency channel. On the other hand, the embodiment of FIG. 3 has a plurality of individual fibers in lines L' of the same length for each respective frequency channel, such as the channel 1 or the channels 2, 3 or 4 of FIG. 1, and each of these fiber lines L' corresponds to and is on a respective spaced apart frequency or spectrum line L. To this end, the spacings between the lines L of FIG. 2 are expanded by suitable lenses, and the lenses of FIGS. 1, 4 and 5 are adjusted to produce this result.

Figure 4:
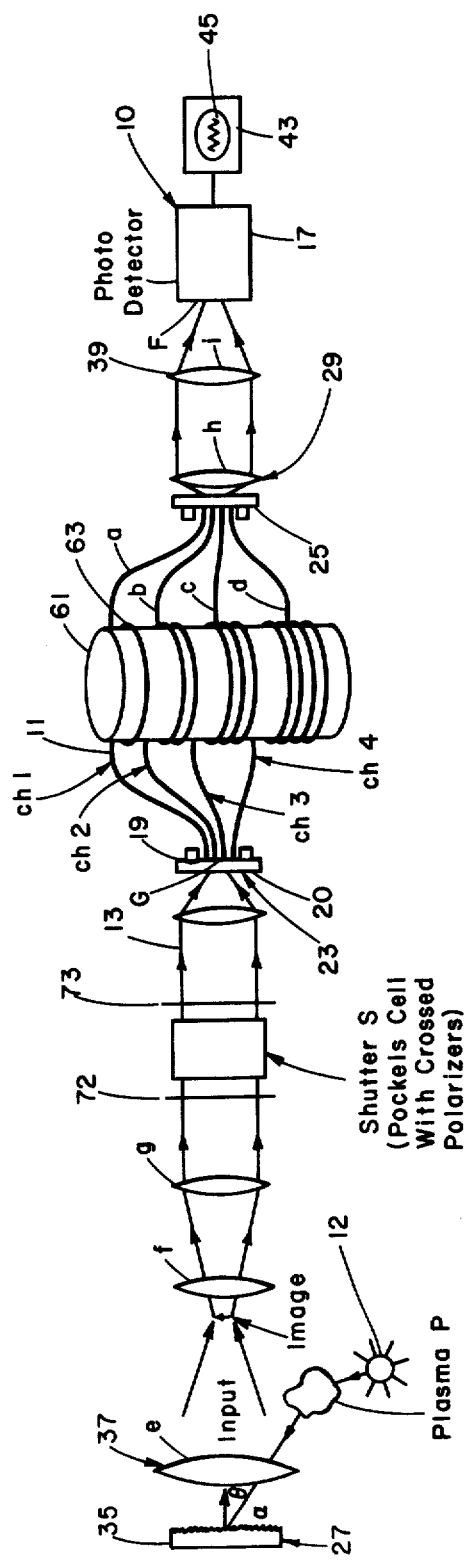
FIG. 4 is a partial three-dimensional view of the practical embodiment of one spectrometer apparatus employing the principles of the apparatus of FIG. 1.
Figure 5:
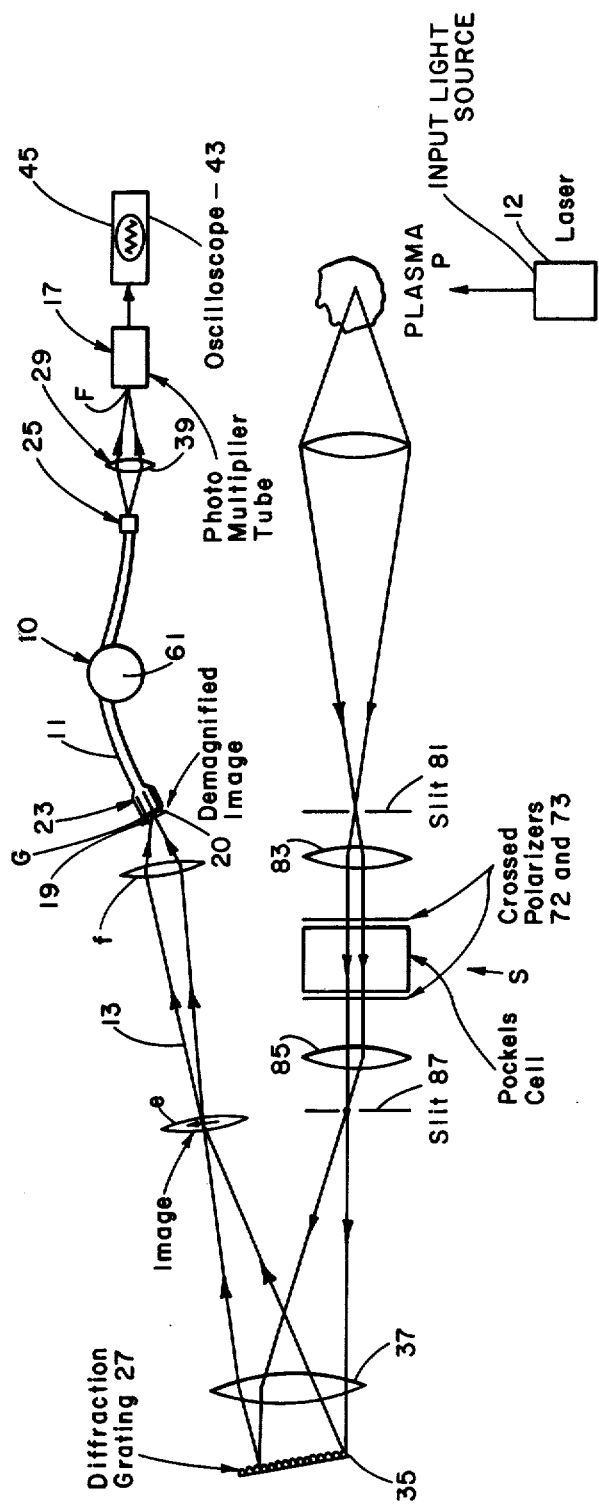
FIG. 5 is a partial schematic view of the embodiment of the spectrometer apparatus of FIG. 4 for diagnosing various characteristics of a high temperature laser produced plasma.

In the practical embodiment of FIGS. 4 and 5, the different length fibers are wound on a support means 61 for winding the fibers to produce turns 63 whose numbers correspond to the lengths of the fibers in each channel. In a practical embodiment for the shutter S, suitable cross pollarizers 72 and 73 are employed, as shown in detail in FIGS. 4 and 5.

According to the system of FIG. 5, the input light beam pulse 13 from light source 12 is scattered by a laser produced plasma P, is received and transmitted by a slit 81, lens 83, shutter S, lens 85, slit 87 and a lens 37 that transmits the pulse against a grating 35 for dispersing the incident light frequencies in space and orientating them in space in a longitudinally extending, rectangular-shaped array in cross-section, which corresponds to the orientation of the fiber ends 19 in space in the input terminal means 23. To this end, the lens 37 refocuses the dispersed or separated and spread frequencies as an input image for lenses e and f to produce a demagnified image on the fiber ends 19 in the input terminal 23 that corresponds to the arrayed frequencies produced by the grating 35. Also, the image is restored at the output end of the fibers after the fibers produce the desired delays. This produces an optical delay in each channel that is refocused by lens 39 on the receiver face of the photo-detector 17 for display on oscilloscope 43, in the manner illustrated in FIGS. 1-a through 1-c. Thus, the time behavior of incident chromatic light that interacts with a time varying plasma to produce complex and variable spectra corresponding with certain important and rapidly changing plasma characteristics and/or parameters can be detected, analyzed, controlled or in some other way utilized.

EXAMPLE I

In one example, in which the lengths of the fibers vary for producing time delays for the respective frequency channels from 1 n sec to 2 microseconds, the fiber lengths vary to produce a uniformly predetermined delay that is stepped about 10 nanoseconds from channel to channel by increasing the channel lengths in steps of 200 cm. Thus, relative to the first channel, the fibers in the next channels are respectively longer by 200 cm progressively to produce delays of 10 n sec, 20 n sec, 30 n sec, 40 n sec, etc. However, the length increase of the fibers from channel to channel can be varied, e.g., to be larger or smaller than 200 cm, depending on whether longer or shorter delays are desired.

EXAMPLE II

The steps of Example I are repeated using low-loss, 1 mm diameter glass fibers having a light loss of less than about 5 db/km.

EXAMPLE III

The steps of Example II are repeated for Thomson scattering analysis of a plasma. To this end, the Thomson scattering laser pulse, which is about 3 nsec long is transmitted through a high temperature plasma and the scattered laser light is received by the spectrometer of this invention for detection of the pulse components by a single photo-multiplier light detection means into which the light transmitted by the fibers is sequentially received in accordance with the time delays effected by the different fiber lengths in the respective channels. Thereupon, a wide band oscilloscope connected to the photomultiplier displays the light detected by the photo-multiplier for recording by conventional photographic techniques.

EXAMPLE IV

Employing like steps, Thomson scattering can be made useful as a plasma diagnostic for providing highly accurate data on plasma temperature and density in plasma discharges with a large-angle ruby laser diagnostic for a $CO_2$ laser-heated plasma in a solenoid at densities $n_e \sim (10^{18} cm^{-3})$. In such an experiment the importance of using a large number of frequency channels in accordance with this invention is advantageous for analyzing the complex electron scattering spectrum. Also, plasma instabilities can be studied.

In this example, both large-angle ($\theta = 150°$) and small-angle ($\theta = 30°, 20°$) measurements were made. The spectra were not simple Maxwellians but were modified by the presence of thermally excited plasma waves. The $\theta = 150°$ measurements were inverted to obtain both $n_e$ and $T_e$ measurement from the shape of the spectrum. The small-angle measurements produced a spectrum that had a sharp spike; this spike was caused by weakly-damped plasma waves and its amplitude could be accurately determined.

As a prerequisite to studying instabilities in a $CO_2$ laser heated plasma, detailed measurements must be made of n (r,z,t) and $T_e$(r,z,t). These measurements require a sufficiently short time resolution and small space localization in order to accurately ascertain the rapidly changing plasma parameters. Due to the limited shot to shot reproducibility of the plasma, the basic plasma parameters are acquired in one shot. For example, very poor results would be obtained from measuring different parts of the scattered spectrum on different shots and then combining them to form an "average" spectrum, since even for the same electron temperature $T_e$ and electron particle number density $n_e$ stray light and small values of time jitter could cause large shotto-shot scattering variations. Thus, the experiment requires a design to find $n_e$(r,z) and $T_e$ in a single shot.

In more detail, the requirements can be summarized as follows:

a. Time resolution: $\Delta t \lesssim 0.5$ n sec; this is because the density and temperature are changing on a time scale of less than 10 nsec in the early stage of plasma formation.

b. Space resolution: $\Delta \times \lesssim 0.25$ mm; this is because the expanding plasma is highly nonuniform and contains strong outwardly propagating shocks. In the early stages of plasma formation (t <5 nsec) even better space resolution would be advantageous.

c. The scattered light spectrum must be recorded on a single shot. As mentioned before, small shot-to-shot plasma variations will render meaningless any spectral measurement average over many shots.

d. Large degree of access; the vacuum system must permit both large and small angle ruby laser Thomson scattering. In addition, one must be free to specify the angle of the ruby laser relative to the $CO_2$ laser. There also must be room to position probes and targets at the focal volume in order to facilitate alignment. To this end, ten 2"-dia. windows can be mounted at 30° incremental angles around the vacuum system to permit the angular access.

e. Measure of n(r,z) independent of Thomson scattering in order to facilitate an understanding of the Thomson scattering results and also to estimate $$|(1/n)(dn/dz)|$$

f. Appropriate timing signals; in general; the timing of the ruby laser relative to plasma breakdown can be controlled only to about ±10 nsec.

The ruby laser constructed for this experiment had an oscillator portion consisting of a Korad K1 ruby laser head in a cavity that was Q-switched by a Brewster stack and a Pockels cell. A transverse mode selector (TMS) aperture selected the $TEM_{00}$ mode and the longitudinal mode selector (LMS) gave the oscillator output a coherence length of 1 m. Both components gave the oscillator an interferometric quality output beam. However, the output pulse of this oscillator had a FWHM of 30 nsec, which was too long to adequately time resolve the laser heated plasma. A second pockels cell PC2 was employed to shorten this pulse to 3 nsec FWHM in the following manner: when PC2 was not triggered, the Glans polarizer reflected the oscillator output beam into a spark gap SG, which then applied a voltage pulse to PC2, which rotated the oscillator output beam for 3 nsec and allowed it to pass through the polarizer.

This oscillator output beam was expanded and directed into a second K1 laser head, which it double passed as it was amplified. The output of this K1 head was then collimated and passed through two K5 ruby laser heads where it was amplified into a 2J 3 nsec FWHM light pulse. This pulse was then directed into the Thomson scattering volume in the plasma by an 8" focal length quartz lens, where it had a measured focal spot diameter of less than 0.25mm. In order to maximize the plasma scattered light, all of the optics between the laser and focal volume were antireflection coated for 6943Å. In addition, a combination of three prisms was used to rotate laser light polarization from horizontal to vertical. This allowed all scattering angles to be used.

The beam splitter inserted between the two K5 ruby laser heads extracts a small part (~3%) of the laser beam in order to illumate the interferometer. The Thomson scattering and inteferometer beam time delays were adjusted so that they both reached the plasma within 2 nsec of each other. This then allowed a determination of $n_e$ (r,z) simultaneous with the Thomson scattering measurement. Before entering the interferometer the laser beam was spatially filtered by a 0.008" pinhole and expanded in order to improve beam quality.

The spectrometer had to satisfy the requirement of having at least ten channels in order to analyze the complicated scattered light spectrum and had to be able to record the complete scattered light spectrum in one shot. Newly-developed low-loss optical fibers donated by Bell Laboratories were used to accomplish the desired time delay $\Delta t$; each optical fiber consisted of a 55 $\mu$m inner-diameter light-conducting core of germania borosilicate glass surrounded by a light-trapping 110 $\mu$m-diameter fused silica jacket. This combination resulted in a fiber with an optical loss of 5dB/km at 0.82 $\mu$m wavelength, as opposed to earlier fibers that have losses in the order of 5dB/m.

The scattered light entered the input slit after passing through a pockels cell and two polarizers, which served as an optical shutter. This shutter was opened for a time duration of about 30 nsec centered about the 3 nsec ruby laser pulse in order to restrict the time duration of the plasma light emission collected by the spectrometer. An early design that did not employ this shutter failed because the plasma emission, which had a duration of about 200 nsec, would be summed over all the channels, whose incremental time delay was only 18 nsec. The result was a noise level far above that found employing the shutter. The shutter eliminated this problem and allowed the 3 nsec time duration ruby laser scattered light to be seen above the noise. Two disadvantages of the shutter were that it inserted a factor of 4 loss into the optical system and that the jitter in its timing further complicated the experiment.

After passing through the slit, the light enters a standard grating having grating groove widths ohe same order of magnitude as the wavelength of the original laser light at the output plane, where it is dispersed in space. The solid angle of light of this dispersed image was directed into the demagnification lens by a field lens at the output plane. The demagnification lens shrunk the image so that it fitted onto the optical fiber input array. This array consisted of twenty optical fibers mounted side by side in an aluminum holder. The ends of the fibers were polished flush to the aluminum and attached to a glass slide with a glue having an optical index of 1.5. This glass slide and glue arrangement served to nullify the imperfections in the optical polish at the ends of the fiber. Each fiber channel then monitored a different portion of the image and therefore a different frequency band; the dispersion was approximately 25Å/fiber channel.

The twenty fibers were routed onto a drum where each fiber was given a successively longer length. In this spectrometer the average incremental delay between channels was 18 nsec. The ends of the fibers were then rejoined in a brass holder and focussed on to a photo-multiplier tube photo-cathode. The tube chosen for this was an RCA C31034A Photo-multiplier with a gain of about $10^6$ and a responsivity that is nearly constant from a wavelength of 3000Å to 8000Å. At 6943Å, this tube had a quantum efficiency of 20%. Each channel was detected by the photomultiplier tube at a successively later time; by knowing the time delay of each channel, the spectrum was compiled. Each frequency channel read out on the oscilloscope as a 5 nsec spike at a successively later time. The spectrum was the envelope of the spikes. In order for this system to work, the spurious light entering the spectrometer from the plasma was limited by the shutter to a time span that was shorter than the incremental time delay between channels.

In view of the above, the incident chromatic light pulse carrying the desired time varying plurality of frequencies to be analyzed spatially and by frequency over a broad range of frequencies is detected by a single light detector. To this end, the light is fed to a grating that is conventional for spreading the light in space and separating the frequencies according to the plurality of frequencies transmitted. Thereupon, the frequencies are manipulated in space by conventional lenses for orientating them in space according to the spatial orientation of the different length fiber input ends. Moreover, the incident space orientated frequencies are matched to the fiber ends in the respective channels by suitably mounting the fiber ends. The fiber in each channel retransmits the light with selective time delays corresponding to and in accordance with the frequencies transmitted and the length of the fibers in each transmitting channel, and the fiber outputs are retransmitted to match the fiber outputs to the detection means for sequentially receiving all the frequency components of the pulse in accordance with the respective time delays desired for the selective frequency and/or spatial analysis of the incident light.

This invention provides a broad range of optical time delays for a broad range of frequencies of incident chromatic light for the selective spatial and/or frequency analysis of the light with a single detector. The invention has the advantages of simplicity, economy, dependability, accuracy and repeatability with a wide range of convential or commercially available components. To this end, this end, this invention has the advantage that commercially available light fibers of different lengths can be used for a wide variety of useful applications, comprising, e.g., the diagnosis of rapidly time varying plasmas produced by laser interactions, plasmas produced in tokamaks, or plasmas produced in other magnetic, non-magnetic, endless or linear configurations, and this diagnosis can be used for Thomson scattered laser light or for laser light used in determining the heating characteristics of a wide variety of plasmas.

What is claimed is:

1. In a Thomson scattering system for diagnosing a time varying plasma with a short incident chromatic light pulse of below 100 nanoseconds duration for the selective spatial and frequency analysis of the light with a single light detector, the improvement for providing a broad range of optical time delays for incident light passing through the plasma that is Thomson scattered by the plasma and contains a variety of frequencies that are dispersed in space as spectral lines according to a specific system of stepping for the selective frequency analysis of the scattered light with a single light detector, comprising:

a. single light detector means;
   b. light source means of a short incident light pulse that is Thomson scattered by the plasma to contain a variety of frequencies for the selective frequency analysis of the Thomson scattered light image by the single light detector means;
   c. A plurality of uniform diameter, low-loss, glass fibers having transparent cores of one index of refraction, annual sleeves of another index of refraction, and flat polished ends normal to their respective fiber axes for receiving and transporting the scattered light image along the fiber areas from end to end with time delays that correspond with the individual lengths of the fibers;
   d. a plurality of frequency channels formed from said fibers having different lengths and a plurality of continuous, equal length fibers in each channel for providing a specific system of stepping that transmits the scattered light image with equal time delays in each of the plurality of fibers in each channel;
   e. spaced apart, picture-frame-shaped terminal means for holding the respective outer, adjacent, terminal diameters of the annual sleeves at the opposite ends of the fibers in each channel in contact with each other in longitudinally extending arrays having correction means for nullifying the imperfections in the polish of the ends and continuously holding the respective ends in spaced apart planes according to a specific system of stepping that is fixed for the different length frequency channels;
   f. matching means adjacent to one terminal means having means for continuously and fixedly dispersing the incident light frequencies in space and orientating the frequencies continuously and fixedly in space as a function of the specific system of stepping provided by the orientation and location in space of the respective different length frequency channels in the one terminal means; and
   g. means adjacent to the other terminal means for continuously and fixedly matching the outgoing light from the respective different length frequency channels of the other terminal means for the detection of the outgoing light by the single light detector means in accordance with the time delays produced by the channels for determining the effects on the light by its being scattered by the time varying plasma; and
   h. shutter means between the light source means and the plurality of channels for selecting a portion of the pulse that is shorter than the successive time delays between channels and transmitting the spatially dispersed frequencies to the channels for detection by the detection means as temporally dispersed frequencies, the detector means being a photomultiplier light detection means for detection of the temporally dispersed frequencies for a time that is long compared to the successive time delays produced.

2. The apparatus of claim 1 in which the different length fibers are mounted on a support means for winding the fibers to produce turns whose numbers correspond to the lengths of the fibers.

3. The apparatus of claim 1 in which the fibers form separate uniformly stepped channels that are spread to receive wavelengths dispersed in increasing lengths by about 25A from channel to channel for uniformly stepped time delays up to about 2 microseconds in duration in accordance with the lengths of the fibers.

4. The apparatus of claim 1 having light fibers including inner light conducting germania borosillicate transmitting cores having losses of less than about 5 db/km, and cylindrical, silica, light-trapping sleeves of a different index of refraction from the cores for forming uniform diameter light pipes that can collect the incident light within the frequency range defined by the inner transmitting cores.

5. The apparatus of claim 1 having correction means comprising a glass slide glued to the fiber ends with a glue having an optical index of 1.5 for nullifying the imperfections in the optical polish at the ends of the fibers.

6. The apparatus of claim 1 for diagnosing a plasma having laser means for producing an incident pulse that is Thomson scatterd by the plasma to emit light for up to 200 nsec and received in space by the matching means for transmitting the dispersed light for detection, for recording and for monitoring in a time that is long compared to the successive time delay between channels.

* * * * *